(12) United States Patent
Taubman et al.

(10) Patent No.: US 7,719,978 B2
(45) Date of Patent: May 18, 2010

(54) METHOD FOR TRANSMITTING DATA OVER LOSSY PACKET-BASED COMMUNICATION NETWORKS

(75) Inventors: David Taubman, Sydney (AU); Johnson Thie, Sydney (AU)

(73) Assignee: NewSouth Innovations Pty Limited, Sydney (AU)

( * ) Notice: Subject to any disclaimer, the term of this patent is extended or adjusted under 35 U.S.C. 154(b) by 780 days.

(21) Appl. No.: 10/571,718

(22) PCT Filed: Sep. 13, 2004

(86) PCT No.: PCT/AU2004/001246

§ 371 (c)(1),
(2), (4) Date: Jan. 29, 2007

(87) PCT Pub. No.: WO2005/027430

PCT Pub. Date: Mar. 24, 2005

(65) Prior Publication Data

US 2007/0115841 A1    May 24, 2007

(30) Foreign Application Priority Data

Sep. 12, 2003    (AU) .............................. 2003905036

(51) Int. Cl.
*H04L 12/28*    (2006.01)
(52) U.S. Cl. ...................... 370/231; 370/236; 370/252; 370/474; 370/476; 370/477; 370/498
(58) Field of Classification Search .................. 370/230, 370/231, 235, 236, 331–333, 338; 455/436
See application file for complete search history.

(56) References Cited

U.S. PATENT DOCUMENTS 6,810,253 B2 * 10/2004 Lee et al. .................... 455/436
2002/0114332 A1 * 8/2002 Apostolopoulos et al. ... 370/392

FOREIGN PATENT DOCUMENTS

US    2003/0135631 A1    7/2003

OTHER PUBLICATIONS

The PCT International Search Report dated Nov. 16, 2004.
The Written Opinion of the International Searching Authority.

* cited by examiner

*Primary Examiner*—Seema S Rao
*Assistant Examiner*—Wanda Z Russell
(74) *Attorney, Agent, or Firm*—Young Basile P.C.

(57) ABSTRACT

The invention is concerned with the transmission of streaming scalable data, particularly video data, through lossy communication channels, for applications in which limited retransmission is possible, and the associated reception and decoding of transmitted data. The PET (Priority Encoding Transmission) framework is used and the invention exploits both unequal error protection and limited retransmission. Each element in the scalable representation of each frame can be transmitted in one or both of two transmission slots, depending on the availability of the data received from the first of the two transmission slots. An optimization algorithm determines the level of protection which should be assigned to each element in each slot, subject to transmission bandwidth constraints. To balance the protection assigned to elements which are being transmitted for the first time with those which are being retransmitted, the proposed algorithm in preferred embodiments formulates a collection of hypotheses concerning its own behavior in future transmission slots.

15 Claims, 6 Drawing Sheets

METHOD FOR TRANSMITTING DATA OVER LOSSY PACKET-BASED COMMUNICATION NETWORKS

FIELD OF THE INVENTION

The present invention relates to a method for transmitting data, more particularly to a method for transmitting streaming scalable data over lossy packet-based communication networks. The invention will primarily be described hereinafter with reference to the transmission of streaming scalably compressed media data, but it should be appreciated that the invention is not limited to this particular field of use.

BACKGROUND TO THE INVENTION

Traditionally, the possibility of transmission errors has been addressed either through the use of forward error correction (FEC) or by automatic repeat request (ARQ) retransmission schemes. FEC approaches are often advocated for the transmission of real-time compressed data, based on the assumption that retransmission might cause unacceptable delays. Much recent research into the protection of scalable compressed imagery over packet-based networks [1], [2], [3], [4], [5], [6], [7], [8], has adopted this perspective, exploiting the "Priority Encoding Transmission" (PET) scheme of Albanese et al. [9] as a framework for unequal error protection.

In some cases, retransmission of lost data may indeed not be possible, due to stringent constraints on the delivery time, or because the transmission medium provides no means for the transmitter to discover whether or not a packet has been correctly received. (It is worth noting, though, that existing protection schemes universally assume the existence of some feedback mechanism, whereby the transmitter is able to discover the prevailing network conditions and hence estimate loss probabilities.) In many applications, however, delivery time constraints merely serve to limit the number of round trips, and hence the number of retransmission opportunities which exist. This perspective is adopted by a considerable body of literature [10], [11], [12], [13], [14], [15], which deals with the optimized delivery of streaming media with limited retransmission. These works include retransmission decisions within the optimization framework. The combination of both limited retransmission and FEC has also been considered in a variety of settings [16], [17], [18], [19], [20], [21], [22]. We shall mention some of these again shortly. For the moment, however, we note that the advantages of the PET framework have not previously been considered in the context of limited retransmission. The one exception to this is the work of Gan and Ma [22], [23]. As we shall see, our proposed strategy differs in a number of important respects from that advanced by Gan and Ma. Moreover, our experimental results confirm that these differences are responsible for virtually all the performance advantages of the proposed scheme, relative to other schemes which do not allow for retransmission.

SUMMARY OF THE INVENTION

Accordingly, the present invention provides a method for transmitting streaming scalably compressed media data over lossy packet-based communication networks, comprising the steps of:

a) obtaining source data comprising independently encoded groups of elements;

b) subjecting each element in a current group to primary channel coding with one from a family of channel codes, the channel code family being augmented to include a symbol corresponding to no transmission of the element (redundancy factor of 0);

c) subjecting each element from a previously transmitted group to secondary channel coding with one from a family of channel codes, the channel code family being augmented to include a symbol corresponding to no transmission of the element (redundancy factor of 0); and d) transmitting the source data over a sequence of transmission slots, each transmission slot comprising a time interval wherein, in each transmission slot, primary channel coded symbols from elements in the current group are transmitted together with secondary channel coded symbols from elements in the previously transmitted group;

e) wherein the primary and secondary channel coded symbols transmitted within each transmission slot are arranged into network packets such that each transmission slot has its own set of network packets;

f) wherein the primary and secondary channel coded symbols sent in each transmission slot are arranged within that slot's network packets following the Priority Encoding Transmission (PET) procedure;

g) wherein information concerning lost packets which are not received by a receiver is either received or inferred by the transmitter;

h) wherein the information concerning lost packets which contain primary coded symbols from said previously transmitted group is used by the transmitter to select secondary channel codes for the elements of the previously transmitted group; and i) wherein the secondary channel coding of each element of the previously transmitted group is performed in a manner which takes advantage of the availability at the receiver of primary coded symbols from the previously transmitted group in packets which were successfully transmitted, so as to avoid or reduce redundant retransmission.

The present invention also provides a transmitter for transmitting streaming scalably compressed media data over lossy packet-based communication networks, comprising:

a) means for obtaining source data comprising independently encoded groups of elements;

b) means for subjecting each element in a current group to primary channel coding with one from a family of channel codes, the channel code family being augmented to include a symbol corresponding to no transmission of the element (redundancy factor of 0);

c) means for subjecting each element from a previously transmitted group to secondary channel coding with one from a family of channel codes, the channel code family being augmented to include a symbol corresponding to no transmission of the element (redundancy factor of 0); and d) means for transmitting the source data over a sequence of transmission slots, each transmission slot comprising a time interval wherein, in each transmission slot, primary channel coded symbols from elements in the current group are transmitted together with secondary channel coded symbols from elements in the previously transmitted group;

e) wherein the primary and secondary channel coded symbols transmitted within each transmission slot are arranged into network packets such that each transmission slot has its own set of network packets;

f) wherein the primary and secondary channel coded symbols sent in each transmission slot are arranged within that slot's network packets following the Priority Encoding Transmission (PET) procedure;

g) wherein information concerning lost packets which are not received by a receiver is either received or inferred by the transmitter;

h) wherein the information concerning lost packets which contain primary coded symbols from said previously transmitted group is used by the transmitter to select secondary channel codes for the elements of the previously transmitted group; and i) wherein the secondary channel coding of each element of the previously transmitted group is performed in a manner which takes advantage of the availability at the receiver of primary coded symbols from the previously transmitted group in packets which were successfully transmitted, so as to avoid or reduce redundant retransmission.

The present invention also provides a method for receiving streamed scalably compressed media data over a lossy packet-based communication network, wherein the data is received and sorted into independently encoded groups of elements, comprising the steps of:

a) receiving data over a sequence of reception slots, each reception slot comprising a time interval wherein primary channel coded symbols from elements in a current group are received together with secondary channel coded symbols from elements in a previous group;

b) wherein the primary and secondary channel coded symbols within each reception slot are arranged into network packets such that each reception slot has its own set of network packets;

c) wherein the primary and secondary channel coded symbols received in each reception slot are arranged within that slot's network packets following the Priority Encoding Transmission (PET) procedure;

d) wherein the method further comprises the step of unpacking the PET packets and sorting the received data into primary channel coded symbols from elements in the current group and secondary channel coded symbols from elements in the previous group;

e) assembling the secondary channel coded symbols from elements in the previous group with primary channel coded symbols from elements in the previous group which have already been received in a previous reception slot;

f) decoding said assembled information for the previous group; and g) determining and sending information to the transmitter, concerning lost packets and/or packets which have been received, h) wherein the information concerning lost and/or available packets which contain primary coded symbols from said current group is capable of being used by the transmitter to select secondary channel codes for the elements of the current group in a manner which takes advantage of the availability at the receiver of primary coded symbols from the current group in packets which were successfully received, so as to avoid or reduce redundant retransmission.

The present invention also provides a receiver for receiving streamed scalably compressed media data over a lossy packet-based communication network, wherein the data is received and sorted into independently encoded groups of elements, comprising:

a) means for receiving data over a sequence of reception slots, each reception slot comprising a time interval wherein primary channel coded symbols from elements in a current group are received together with secondary channel coded symbols from elements in a previous group;

b) wherein the primary and secondary channel coded symbols within each reception slot are arranged into network packets such that each reception slot has its own set of network packets;

c) wherein the primary and secondary channel coded symbols received in each reception slot are arranged within that slot's network packets following the Priority Encoding Transmission (PET) procedure;

d) wherein the receiver further comprises means for unpacking the PET packets and sorting the received data into primary channel coded symbols from elements in the current group and secondary channel coded symbols from elements in the previous group;

e) means for assembling the secondary channel coded symbols from elements in the previous group with primary channel coded symbols from elements in the previous group which have already been received in a previous reception slot;

f) means for decoding said assembled information for the previous group; and g) means for determining and sending information to the transmitter, concerning lost packets and/or packets which have been received, h) wherein the information concerning lost packets and/or available packets which contain primary coded symbols from said current group is capable of being used by the transmitter to select secondary channel codes for the elements of the current group in a manner which takes advantage of the availability at the receiver of primary coded symbols from the current group in packets which were successfully received, so as to avoid or reduce redundant retransmission.

Preferably, one or both of said families of channel codes, include a symbol with rate 1 (redundancy factor 1). In one embodiment, the families of channel codes used for primary and secondary channel coding have the properties of maximum distance separable (NDS) codes. Preferably also, one or both of said families of channel codes is augmented to include the option for sending no symbols whatsoever (neither data nor parity symbols).

The transmitter may determine primary and secondary channel codes to use during a particular transmission slot, using estimates of the anticipated packet loss rate. Preferably, primary and secondary channel codes are selected within each transmission slot in a manner which is consistent with maximizing a measure of total expected quality of the reconstructed media stream, taken over all groups of elements, where the expectation is conditioned upon knowledge of the channel codes selected in previous transmission slots and the packets lost from previous transmission slots, subject to a constraint on the total transmitted data rate. The maximization procedure may be constrained by a limit on the number of symbols which can be transmitted within the current transmission slot.

Preferably, the transmitter formulates and optimizes an optimization objective which involves hypotheses regarding the secondary channel codes which will be assigned to elements from the current frame in a future transmission slot, in the event that one packet from the current slot is lost, two packets from the current slot are lost, three packets from the current slot are lost, and so forth. More particularly, preferably the optimization objective involves a lambda-balance equation, in which lambda is assumed to take the same value in both the current transmission slot and the future transmission slot in which the hypothetical secondary channel codes shall be selected. In one embodiment the scalably compressed media data represents a compressed video signal wherein each group of elements comprises a video frame. However, the present invention may be employed in other embodiments, involving video, audio or other media signals, wherein each group of elements represents compressed data (e.g., media sample values or transformed media sample values) which can meaningfully be decompressed without reference to the elements in other groups.

Preferably, in the receiving method, the steps of assembling and decoding said secondary and primary channel coded information for elements in the previous group comprise the steps of: decoding said secondary channel coded symbols; augmenting the primary channel coded information for those same elements; and decoding said augmented channel coded information to recover elements from the previous group.

The present invention also provides computer readable medium including instructions for controlling a computing system for implementing a method as defined above, and the computer readable medium having such instructions stored in computer memory/disc or other physical storage devices thereon.

The present invention shows how the PET (Priority Encoding Transmission) framework may be leveraged to exploit both unequal error protection and limited retransmission, for RD optimized delivery of streaming media. Previous work on scalable media protection with PET has largely ignored the possibility of retransmission. Conversely, the PET framework has not been harnessed by the substantial body of previous work on RD optimized hybrid FEC/ARQ schemes. The present invention is applicable to sources which can be modelled as independently compressed groups (e.g., video frames). Each element in the scalable representation of each frame can be transmitted in one or both of two transmission slots, depending on the availability of the data received from the first of the two transmission slots. An optimization algorithm determines the level of protection which should be assigned to each element in each slot, subject to transmission bandwidth constraints. To balance the protection assigned to elements which are being transmitted for the first time with those which are being retransmitted, the proposed algorithm in preferred embodiments formulates a collection of hypotheses concerning its own behaviour in future transmission slots. We show how the PET framework allows for a decoupled optimization algorithm with only modest complexity. Experimental results demonstrate that substantial performance benefits can be obtained using the proposed framework.

BRIEF DESCRIPTION OF THE DRAWINGS

Preferred embodiments of the present invention will now be described with reference to the accompanying drawings, in which.

DETAILED DESCRIPTION

Figure 1:
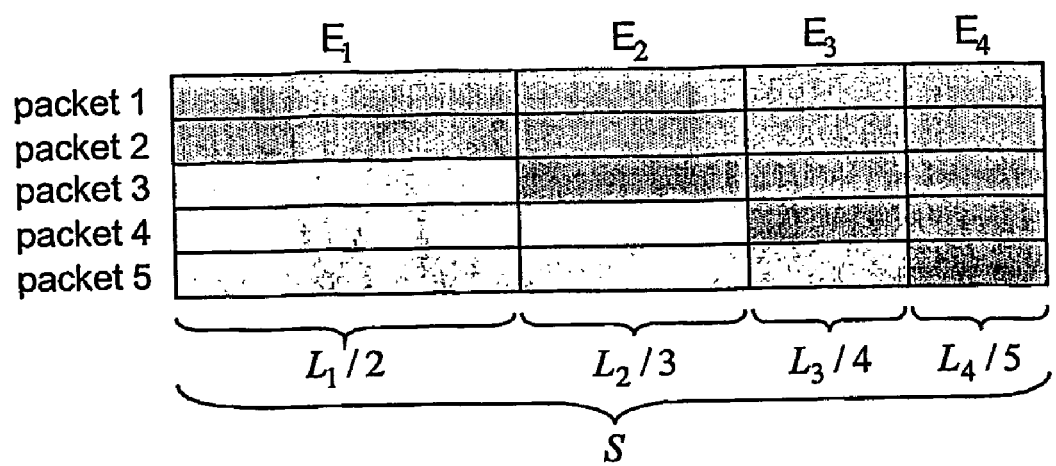
FIG. 1 illustrates an example of a PET frame comprising N=5 packets, into which Q=4 elements are coded.

The invention is concerned with the robust transmission of streaming scalable data through lossy communication channels, for applications in which limited retransmission is possible. For explanatory purposes, the discussion which follows is limited to scalably compressed video frames. However, the invention described here can clearly be applied to the protection of other real-time media, such as audio.

Scalable Source Frames

To study the delivery of streaming scalable media in the context of limited retransmission, we model the scalable data source as a sequence of "frames", each of which is compressed independently. Highly scalable image compression schemes have been widely investigated over the past 15 years. Some of the most notable algorithms to emerge from these efforts are the EZW [24] and SPIHT [25] algorithms, and the JPEG2000 [26] image compression standard. The latter is based on a variety of important concepts, including context-adaptive bit-plane coding [27], context-adaptive bit-plane reordering [28], [29], and embedded block coding with optimized truncation [30].

These algorithms all produce compressed bit-streams, with the property that low quality representations are embedded within higher quality representations. Equivalently, the compressed bit-stream may be viewed as a succession of elements $E_q$, $1 \leq q \leq Q$, having coded lengths $L_q$, which progressively augment the received image quality. For the embedded representation to be efficient, the image quality obtained when the image is reconstructed from an initial $Q' \leq Q$ of these elements should be comparable to that which could be obtained if the image were compressed using any other efficient algorithm, be it scalable or otherwise, to the same total length $L = \Sigma_{q=1}^{Q'} L_q$. Modern scalable image compression algorithms such as SPIHT and JPEG2000 are efficient in this sense.

Scalable video compression algorithms have also been the subject of intense research [31], [32], [33], [34], [35], [36], [37], with recent results demonstrating performance approaching that of the most advanced non-scalable techniques, while offering a large number of embedded elements (see, for example, [38]). The key difference between scalable image compression and scalable video compression is that a motion-compensated temporal transform is required, to efficiently exploit inter-frame redundancies.

For the purpose of this description, it is convenient to model any scalably compressed video stream as a sequence of independently compressed source frames F[n], each of which has its own collection of embedded elements. In the simplest case, each original frame of the video sequence is independently compressed using a scalable image coder. More generally, when the original video frames are compressed jointly, so as to exploit motion redundancy, the compressed representation produced by any of the highly scalable video compressors of which we are aware may still be modeled as a sequence of element groups, where the elements in each group are coded independently from those in other groups. These element groups are identified variously in the literature as groups of pictures, frame slots, and so forth. The theory and algorithms described in this document may be applied directly to such data streams by treating each independent element group as a separate source frame, F[n]. For the discussion which follows, however, it is simplest to think of the F[n] as actual compressed video frames.

The PET Framework

The lossy communication channels considered in this description are packet-based, where the packet transport model is that of an erasure channel. An erasure channel is one in which each packet either arrives intact or is entirely lost. A key property of erasure channels is that the receiver knows exactly which packets have been lost (the erasures). This is a good model for most packet-based communication applications, although we note that packet loss in IP networks is usually assessed on the basis of excessive arrival delay, rather than certain knowledge that it has been lost.

In the context of erasure channels, Albanese et al. [9] introduced PET. The PET scheme works with a family of (N,k) channel codes, all of which have the same codeword length N, but different source lengths, $1 \leq k \leq N$. We consider only "maximum distance separable" (MDS) codes, which have the key property that receipt of any k out of the N symbols in a codeword is sufficient to recover the k source symbols. The amount of redundancy, $R_{N,k}=N/k$, determines the strength of the code, where smaller values of k correspond to stronger codes. It is convenient to augment this set of channel codes with the special value $k=\infty$, for which $RN_{N,\infty}=0$, meaning that the element is not transmitted at all. Note that redundancy, $R_{N,k}$, is the reciprocal of the more commonly used "code rate," k/N. We find it more convenient to refer to redundancy, rather than code rate, in large part due to the importance of the case $R_{N,\infty}=0$.

We measure the length $L_q$ of each scalable source element $E_q$ in symbols. Each source symbol might, for example, correspond to an 8-bit byte, although other symbol sizes may also be used. Given a collection of source elements $E_1$, $E_2$, ... $E_Q$, having uncoded lengths $L_1$, $L_2$, ..., $L_Q$, and channel code redundancies $R_{N,k_1} \geq R_{N,k_2} \geq \ldots \geq R_{N,k_Q}$, the PET scheme packages the encoded elements into N network packets, which we call a PET frame. $L_q/k_q$ source symbols are placed in each of the first $k_q$ packets, while each of the remaining $N-k_q$ packets contains $L_q/k_q$ parity symbols. This arrangement guarantees that receipt of any $k' \geq k_q$ packets is sufficient to recover element $E_q$. The total encoded transmission length is $\Sigma_q L_q R_{N,k_q}$, which must be arranged into N packets, each having S symbols. FIG. 1 shows an example of arranging Q=4 elements into a PET frame consisting of N=5 packets. Consider element $E_2$, which is assigned a (5,3) code. Since $k_2=3$, three out of the five packets together contain the source element's $L_2$ symbols, while the remaining 2 packets contain parity symbols. Hence, receiving any 3 packets guarantees recovery of element $E_2$ and also $E_1$, but not $E_3$ or $E_4$. The PET frame construction described here ignores the possibility that $L_q$ might not be exactly divisible by $k_q$. To deal with this eventuality in practice, some symbols from $E_{q+1}$, may be protected with the $(N,k_q)$ code used for $E_q$, rather than the (potentially weaker) code which is otherwise used for the elements of $E_{q+1}$.

Using the PET framework, several strategies [1], [2], [3], [4], [5], [6], [7], [8] have been proposed for finding the optimal channel code assignment for each source element, under the condition that the total encoded transmission length should not exceed a specified limit, $L_{max}=NS$. Generally, the optimization objective is an expected utility U, which must be an additive function of the source elements that are correctly recovered. That is, $$U = U_0 + \sum_{q=1}^{Q} U_q P_{N,k_q} \quad (1)$$

where $U_0$ is the amount of utility at the receiver when no source element is received, $U_q$ is the utility associated with receiving $E_q$, and $P_{N,k_q}$ is the probability of recovering the source element $E_q$, which is assigned an $(N,k_q)$ channel code. Specifically, $P_{N,k_q}$ is equal to the probability of receiving at least $k_q$ out of N packets. As already mentioned, the special value $k_q=\infty$ is reserved for source elements which are not transmitted, having probability $P_{N,\infty}=0$. Commonly, $-U$ represents the Mean Squared Error (MSE) of the reconstructed image or video frame, and $U_q$ corresponds to a reduction in MSE associated with recovery of element $E_q$. The term $U_0$ is included only for completeness; it plays no role in the intuitive or computational aspects of the optimization problems with which we are concerned.

Limited Retransmission

Figure 2:
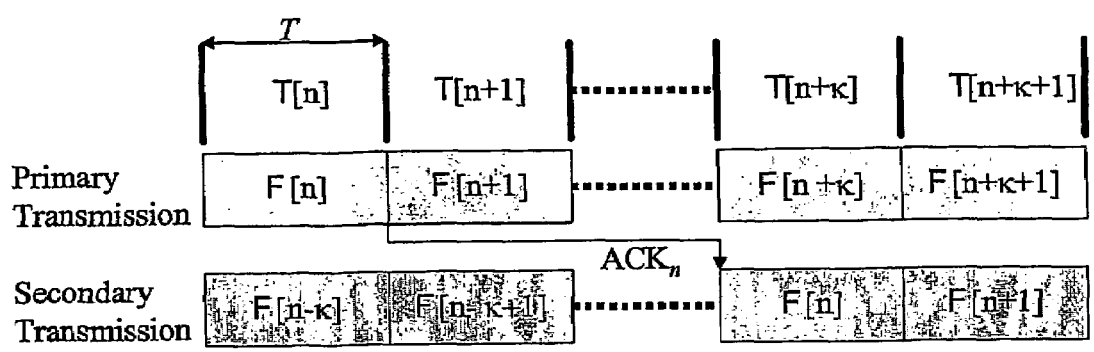
FIG. 2 illustrates the relationship between source frames and transmission slots.

As mentioned already, we are interested in applications where limited retransmission of lost data is possible. To simplify matters, this discussion is concerned with the case in which the scalable source elements which constitute each source frame have two opportunities for transmission. Each source frame F[n] is assigned a primary transmission slot T[n], and a secondary transmission slot T[n+κ], during which information may be retransmitted. Each transmission slot has a fixed duration of T seconds, so that source frames are transmitted at a constant rate of 1/T frames per second. The primary and secondary transmission slots are separated by at least (κ−1)T seconds, and the value of κ is chosen so that this separation is long enough for the transmitter to discover whether or not packets sent during the primary transmission slot arrived successfully. FIG. 2 illustrates the relationship between source frames and transmission slots.

In the context of FIG. 2, it is possible to appreciate the key challenges of the protection assignment problem with which we are concerned. During any given transmission slot T[n], the transmitter must distribute the available bandwidth between the primary transmission of elements from source frame F[n] and the secondary transmission (retransmission) of elements from source frame F[n−κ]. We write $L_{max}$ for the maximum number of symbols which may be transmitted within slot T[n], and adopt the PET framework to encode elements from both source frames within a single PET frame, having N packets, each with at most S symbols, where $NS=L_{max}$. Since the source data must be transmitted in real-time, and the channel conditions may be subject to change over time, the transmitter must determine how best to distribute the total of $L_{max}$ symbols between two different source frames, without knowing how many packets will be lost or what protection might be applied to the retransmission of any lost data from frame F[n] in its secondary transmission slot T[n+κ].

A key element of the invention described here is a general framework for solving the protection assignment problem mentioned above. To do this, we formulate a collection of hypotheses concerning the current frame's secondary transmission, which will take place in the future. We coin the term LR-PET (Limited Retransmission PET) to describe this novel framework, and we show how an optimal solution to the LR-PET assignment problem may be found with remarkably low computational complexity.

To appreciate the potential advantage of LR-PET over frame-by-frame PET, consider again the example of FIG. 1, and suppose that only packets 1 and 3 arrive at the receiver. Without the possibility of retransmission, only element $E_1$ may be successfully recovered. If retransmission is permitted, however, only the $L_2/3$ source symbols of $E_2$ which belong to packet 2 need be retransmitted in order for the receiver to recover the whole of element $E_2$. The relative value of these symbols is thus much higher during retransmission than it was during the original transmission, since the full utility of $E_2$ can be realized at one third of its full transmission cost. A similar argument may be applied to the retransmission of symbols from the other elements, $E_3$ and $E_4$. Thus, LR-PET essentially augments the set of source symbols which may be transmitted (and protected) during a transmission slot with retransmitted source symbols, where the latter generally have elevated utility-length ratios. Higher utility-length ratios allow a larger expected utility to be achieved with LR-PET than with PET, subject to the transmission slot's length budget, $L_{max}$.

In any given transmission slot, T[n], the temptation to favour retransmitted elements from frame F[n−κ], with their higher effective utility-length ratios, over elements from frame F[n], must be balanced by the fact that the utility-length advantage of future retransmissions (in slot T[n+κ]) hinges on assigning the elements of F[n] some bandwidth during slot T[n]. This emphasizes the importance of including hypotheses concerning the future retransmission of elements from F[n], when optimizing the distribution of bandwidth between elements from frames F[n] and F[n−κ].

Related Work

At this point it is possible to compare and contrast our proposed approach with other relevant protection optimization frameworks. Perhaps the most relevant previous work is that of Chou and his co-authors, which is well represented by [14], [17], [18], amongst other papers. Chou et al. advance a powerful framework for rate-distortion optimal delivery of streaming scalable media, allowing for both FEC and retransmission with deadlines. At each transmission opportunity (or transmission slot), the server explores the impact of various policies for both the current transmission and hypothetical future retransmissions, searching for the policy which optimizes the expectation of a Lagrangian cost function. In this regard, their approach is essentially identical to our own, as developed in Section IV. Related ideas may be found to varying degrees in [10], [11], [12]. In each case, the idea is to model the effect of different transmission policies on the properties of a Markov decision process, finding the policy which maximizes the expectation of a utility objective over all paths through the state transition trellis.

A key challenge associated with such schemes is to manage the explosion in complexity (size of the state space) which arises from the interaction between transmission policies for each source element, especially in the context of a rich set of error correction options and/or acknowledgment failure possibilities. To the best of our knowledge, the optimization problem has not previously been cast within the PET framework. We show here that the PET framework allows the optimization problem to be decomposed into a set of independent optimization problems, associated with each successive source element in the primary frame. This allows us to avoid sub-optimal iterative policy optimization schemes, such as the SA algorithm which underpins the work of Chou et al. Besides simplifying the optimization algorithm, the PET framework is also fundamentally more efficient than one in which each source element is separately packetized and channel encoded, as envisaged by previous works which consider retransmission. This is because whenever a source element arrives at the decoder, all higher priority source elements on which it depends are also guaranteed to arrive. It is this property which yields the linear utility expression in equation (1), as opposed to the necessarily smaller polynomial utility expressions manipulated by Chou and others.

Very recently, Gan and Ma [22], [23] proposed a transmission optimization framework which does combine PET with the possibility of limited retransmission. Their approach, however, differs in many important respects from that proposed here. Gan and Ma do not recognize that it is generally only necessary to retransmit a subset of the symbols associated with a lost source element. As explained in the example above, this has the important effect of increasing the effective utility-length ratio for retransmitted elements, accounting for much of the advantage of LR-PET over frame-by-frame PET. Quite to the contrary, results reported in [22] indicate a loss in overall expected utility, while those reported in [23] indicate only small gains and occasional overall losses, as retransmission is added to frame-by-frame PET. Further, the optimization objective in [22], [23], does not account for the potential retransmission of elements which are currently being transmitted/protected for the first time. The formulation of hypotheses to account for future retransmission is a central theme in our framework. In fact, our experimental investigations indicate that the formulation of these hypotheses is responsible for most of the transmission efficiency gains from the invention described herein. It should be noted that Gan and Ma's work is motivated principally by the desire to minimize quality fluctuations from frame to frame, rather than maximizing an overall expected utility objective, as formulated in our present work.

The remainder of this document is organized as follows. Section II explores the erasure channel model more thoroughly, introducing the notation which we shall use throughout. Section III then reviews the problem of optimal protection assignment for a single scalable data source (e.g., a compressed image), with a linearly dependent sequence of elements $E_q$, without the possibility of retransmission. Section IV describes our proposed LR-PET framework and the associated protection assignment strategy.

II. Channel Model and Coding

The channel model we use is that of an erasure channel, where the receiver knows exactly which packets have been lost. Packet loss may result from either corruption or congestion. The simplest example of such a channel model is an IID packet loss model, with packet loss probability p. However, the theoretical results and analytical methods of the invention described here are not restricted to IID models. The Gilbert-Elliott~[39] model, for example, is commonly used to model the bursty loss patterns observed in networks which are subject to congestion. The invention's performance benefits have been experimentally validated in the case of both the IID and Gilbert-Elliott models.

With the IID loss model, the probability of receiving at least k out of N packets with no error is given simply by $$P_{N,k} = \sum_{i=k}^{N} \binom{N}{i} (1-p)^i p^{N-i} \qquad (2)$$

Figure 3:
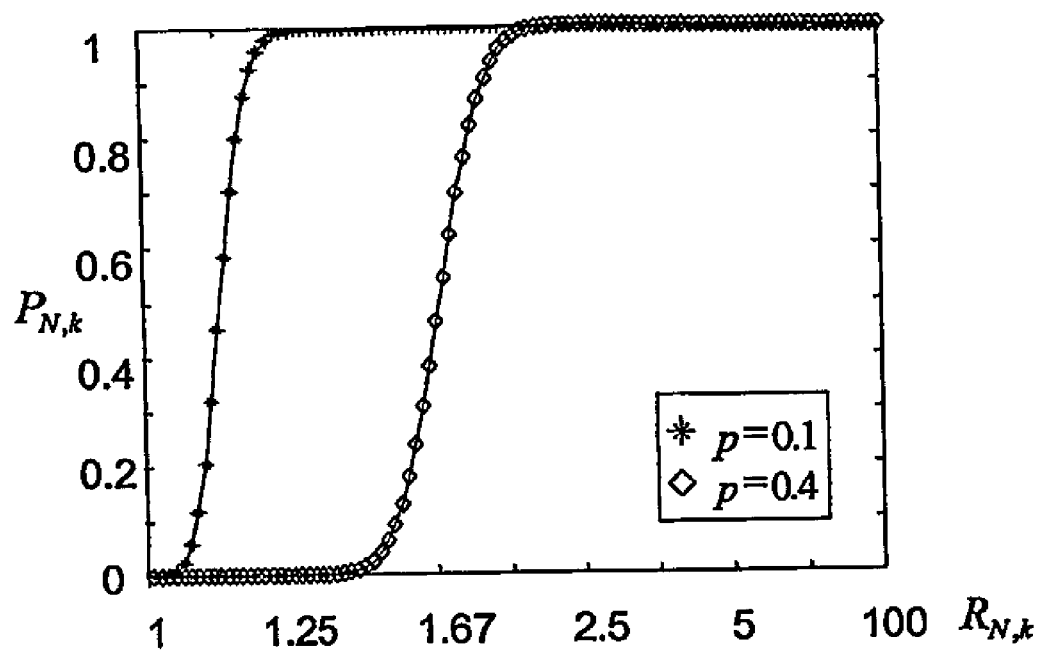
FIG. 3 illustrates an example of the relationship between $P_{N,k}$ and $R_{N,k}$.

FIG. 3 shows an example of the relationship between $P_{N,k}$ and $R_{N,k}$, for the cases p=0.1 and p=0.4, with codeword length N=100. Evidently, $P_{N,k}$ is monotonically increasing with $R_{N,k}$, but note that the curve is not convex. Throughout this paper, we use the term "convex" to mean "convex ∩." Convex ∩ functions are also sometimes called "concave," although we do not use that term here. As described in the next section, optimal solutions to the protection assignment problem for a single scalable data source must inevitably be drawn from the upper convex hull of this curve. However, this need not necessarily be the case for the limited retransmission scenario with which we are ultimately concerned.

It is convenient to parametrize $P_{N,k}$ and $R_{N,k}$ by a single parameter r, defined by $$r = \begin{cases} N+1-k, & k \neq \infty \\ 0, & k = \infty \end{cases} \quad (5)$$

r may be interpreted as a redundancy index. Evidently, r lies in the range 0 to N, with r=0 corresponding to the case where no information is transmitted, and r=N corresponding to the case where only 1 of the N transmitted packets need be received for correct decoding. The redundancy index is more intuitive than k, as a measure of the strength of the channel code, particularly in view of the importance of the case r=0.

Since each of our PET frames will always involve N packets, we find it convenient to drop the explicit dependence on N. This leads to the simplified notation $$P(r) = P_{N,k_{min}(r)}, R(r) = R_{N,k_{min}(r)} \quad (3)$$

where $$k_{min}(r) = \begin{cases} N+1-r, & r > 0 \\ \infty, & r = 0 \end{cases} \quad (4)$$

is the minimum number of packets which must be received if an element which has been assigned redundancy index r is to be recovered.

III. Pet Protection Assignment for a Single Source

Figure 4:
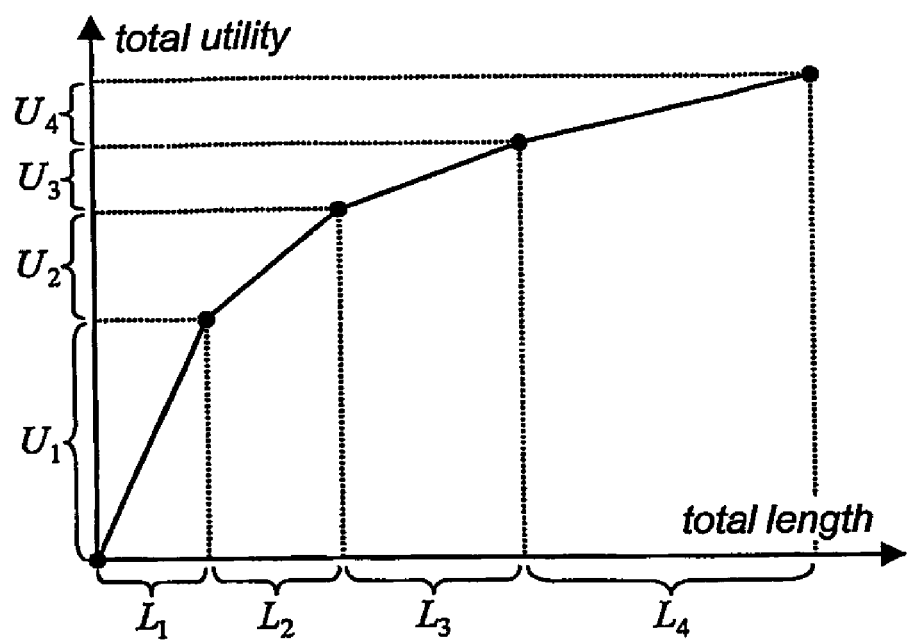
FIG. 4 illustrates an example of the convex utility-length characteristic for a source consisting of 4 elements.

This section reviews the problem of assigning an optimal set of channel codes to the elements $E_1$ through $E_Q$ of a single source frame F, subject to a constraint $L_{max}$ on the length of the PET frame. For applications where retransmission is not possible, we use the methods described here to protect each source frame F[n] within its own transmission slot T[n]. The material presented here also serves to facilitate our later discussion of the more complex LR-PET assignment problem, where primary and secondary transmissions of two different frames must be jointly protected. Several schemes have been reported for finding optimal channel codes within the PET framework [1], [2], [3], [4], [5], [6], [7]. For the purpose of this review, we follow the development in [8]. In that work, a general set of results is provided for sources whose utility-length characteristic need not be convex and channel codes whose probability-redundancy characteristic need also not be convex. For our present purposes, however, we shall assume that the source utility-length characteristic is convex ∩, as illustrated in FIG. 4. That is, $$\frac{U_1}{L_1} \geq \frac{U_2}{L_2} \geq \ldots \geq \frac{U_Q}{L_Q} \quad (5)$$

We assume that the source elements exhibit a linear dependency structure, $E_1 < E_2 < \ldots -E_Q$, meaning that elements $E_1$ through $E_q$ must all be available before $E_{q+1}$ can be correctly decoded. To each element $E_q$, we assign a channel code with codeword length N and redundancy index $r_q$, placing all encoded elements within a PET frame with N packets. Our goal is to find the set of redundancy indices $r_q$, which maximize the expected utility, subject to the length constraint $$L = \sum_{q=1}^{Q} L_q R(r_q) \leq L_{max} \quad (6)$$

Without any loss of generality, we may restrict our attention to solutions which satisfy $r_1 \geq r_2 \geq \ldots \geq r_Q$. To see this, suppose the expected utility is maximized by a set of redundancy indices $\{r_q'\}$ where $r_q' < r_{q+1}'$ for some q. An alternate set of redundancy indices $\{r_q''\}$ may be formed from $\{r_q''\}$, by setting $r_{q+1}'' = r_q'$ and leaving all other indices unchanged. This alternate set has a smaller encoded length, since $R(r_{q+1}'') = R(r_q') < R(r_{q+1}')$. However, it has exactly the same expected utility, since $E_{q+1}$ cannot contribute to the utility unless $E_q$ is successfully recovered, so there is no point in protecting $E_{q+1}$ more strongly than $E_q$. Iterating the construction, if necessary, we see that any optimal set of redundancy indices $\{r_q'\}$ may be progressively converted into a (possibly different) set $\{r_q''\}$, having exactly the same expected utility, at most the same encoded length, and satisfying $r_1'' \geq r_2'' \geq \ldots \geq r_Q''$. It follows that the indices $\{r_q''\}$ also maximize the expected utility, subject to the same length constraint.

Since $r_1 \geq r_2 \geq \ldots \geq r_Q$, the PET framework guarantees that elements $E_1$ through $E_q$ will all be correctly received, so long as $E_q$ is correctly received. The expected utility U, available at the receiver, can then be expressed as $$U = U_0 + \sum_{q=1}^{Q} U_q P(r_q)$$

and our task is to maximize U, subject to $r_1 \geq r_2 \geq \ldots \geq r_Q$ and the length constraint of equation (6).

The length-constrained optimization problem may be converted to a family of unconstrained optimization problems, parametrized by a quantity $\lambda < 0$. Specifically, let $U^{(\lambda)}$ and $L^{(\lambda)}$ denote the expected utility and transmission length associated with the set of redundancy indices $\{r_q^{(\lambda)}\}$, which maximize the Lagrangian-style functional $$J^{(\lambda)} = U^{(\lambda)} - \lambda L^{(\lambda)} = \sum_{q=1}^{Q} (U_q P(r_q^{(\lambda)}) - \lambda L_q R(r_q^{(\lambda)})), \quad (7)$$

subject to $r_1^{(\lambda)} \geq r_2^{(\lambda)} \geq \ldots \geq r_Q^{(\lambda)}$. Evidently, it is impossible to increase U beyond $U^{(\lambda)}$, without also increasing L beyond $L^{(\lambda)}$. Thus, if we can find $\lambda$ such that $L^{(\lambda)} = L_{max}$, the set $\{r_q^{(\lambda)}\}$ will form an optimal solution to our problem. In practice, the discrete nature of the problem may prevent us from finding a value $\lambda$ such that $L^{(\lambda)}$ is exactly equal to $L_{max}$, but if the elements are small enough, we should be justified in ignoring this small source of sub-optimality and selecting the smallest value of $\lambda$ such that $L^{(\lambda)} \geq L_{max}$.

Now suppose we temporarily ignore the constraint that the redundancy indices $r_q^{(\lambda)}$ must be non-increasing. We shall find that the resulting solutions will then be automatically guaranteed to satisfy this constraint. The unconstrained optimization problem decomposes into a collection of Q separate maximization problems. In particular, we seek $r_q^{(\lambda)}$ which maximizes $$J_q^{(\lambda)} = U_q P(r_q^{(\lambda)}) - \lambda L_q R(r_q^{(\lambda)})$$

for each q=1, 2, ..., Q. Equivalently, $$r_q^{(\lambda)} = \arg\max_r [P(r) - \lambda_q R(r)]$$

where $\lambda_q = \lambda L_q/U_q$.

Figure 5:
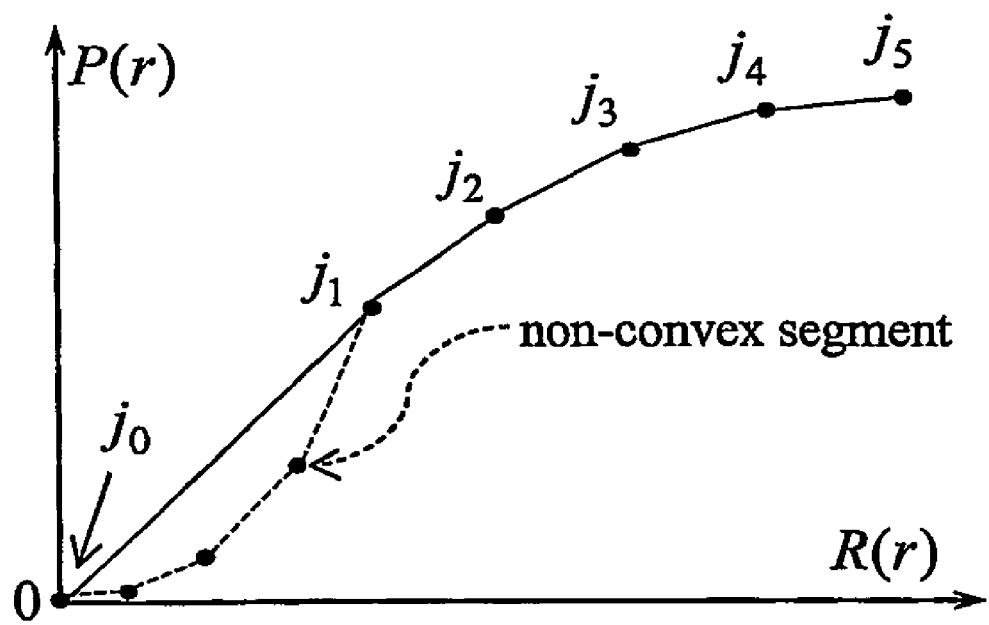
FIG. 5 illustrates the upper convex hull of a non-convex P(r) vs. R(r) characteristic.

This optimization problem arises in other contexts, such as the optimal truncation of embedded compressed bit-streams [26, chapter 8]. It is known that the solution $r_q^{(\lambda)}$ must belong to the set $H_C$ which describes the upper convex hull of the P(r) vs. R(r) characteristic, as shown in FIG. 5. If $0=j_0<j_1<\ldots$ is an enumeration of the elements in $H_C$, and $$S_C(i) = \begin{cases} \frac{P(j_i) - P(j_{i-1})}{R(j_i) - R(j_{i-1})}, & i > 0 \\ \infty, & i = 0 \end{cases} \quad (8)$$

are the "slope" values on the convex hull, then $S_C(0) \geq S_C(1) \geq \ldots$. The solution to our optimization problem can then be found from $$r_q^{(\lambda)} = \max\{j_i \in H_C \mid S_C(i) \geq \lambda_q\} \quad (9)$$
$$= \max\left\{j_i \in H_C \mid S_C(i)\frac{U_q}{L_q} \geq \lambda\right\}$$

Moreover, since the source is convex (equation (5)), we must have $\lambda_q \geq \lambda_{q+1}$, from which we deduce that $r_q^{(\lambda)} \geq r_{q+1}^{(\lambda)}$. That is, the redundancy indices which maximize the unconstrained objective of equation (7) are guaranteed to satisfy the constraint $r_1^{(\lambda)} \geq r_2^{(\lambda)} \geq \ldots \geq r_Q^{(\lambda)}$, as promised. In summary, the optimal set of channel code redundancy indices is found by searching for the smallest value of $\lambda$ such that the solutions $r_q^{(\lambda)}$ yielded by equation (9) produce a PET frame length $L^{(\lambda)}$ which is no larger than $L_{max}$. The monotonic dependence of $r_q^{(\lambda)}$, and hence $U^{(\lambda)}$ and $L^{(\lambda)}$, on $\lambda$, renders this search problem particularly simple. A trivial bisection search, for example, limits the number of distinct values for $\lambda$ which must be tried to at most the numerical precision (number of bits) used to represent slope values.

IV. The LR-PET Framework

In the previous section, we assumed that each frame F[n] has its own transmission slot T[n], without any possibility for retransmission of lost data in future transmission slots. This led to a relatively simple strategy for assigning optimal redundancy indices $r_q$[n] to its elements $E_q$[n]. In this section, we consider the more general context, in which each source frame F[n] has both a primary transmission slot T[n], and a secondary transmission slot T[n+κ]. FIG. 2 illustrates the relationship between source frames and transmission slots.

During transmission slot T[n], the transmitter selects redundancy indices $r_q$[n] for each element of the primary frame F[n], as well as retransmission redundancy indices $s_q$[n−κ] for each element of frame F[n−κ], subject to a limit $L_{max}$ on the total number of symbols which can be transmitted within any slot. We shall consistently use the notation $r_q$ and $s_q$ to refer to the redundancy indices associated with primary and secondary transmission, respectively. We also remind the reader that the case in which an element is not transmitted at all is captured by the assignment of a redundancy index of 0.

The objective is to jointly optimize the parameters $r_q$[n] and $s_q$[n−κ], subject to the length constraint $L_{max}$ on slot T[n]. To appreciate the nature of this problem, note that the utility of frame F[n] at the receiver depends on both $r_q$[n] and $s_q$[n], yet we must optimize the $r_q$[n] and $s_q$[n−κ] parameters together, without precise knowledge of which packets from frame F[n] will be lost, or what protection might be assigned to the retransmission of lost data. The invention adopts the PET framework, jointly protecting all source elements transmitted in slot T[n] with a single PET frame of N packets.

To address the dependence of $r_q$[n] on the $s_q$[n] values, which will not be assigned until the future transmission slot T[n+κ], a collection of hypotheses is formulated regarding what might happen in that slot. Write $\rho_k$ for the probability that exactly k of the N packets transmitted in T[n] is correctly received. Each value of k generates a separate hypothesis. The expected utility of frame F[n] may then be expressed as $$E[U[n]] = U_0[n] + \sum_{k=0}^{N} \rho_k \sum_q U_q[n] P(k, r_q[n], s_q^k[n]) \quad (10)$$

where $P(k, r_q[n], s_q^k[n])$ is the probability that element $E_q$[n] will be correctly received if it is assigned a redundancy index of $r_q$[n] in slot T[n], if only k of the N packets transmitted in that slot are received correctly, and if the remaining data is retransmitted with a redundancy index of $s_q^k$[n] in slot T[n+κ]. It is important to note that the additive formulation in equation (10) is valid only so long as the real and hypothetical redundancy indices satisfy $$r_q[n] \geq r_{q+1}[n], \forall q \text{ and } s_q^k[n] \geq s_{q+1}^k[n], \forall q,k \quad (11)$$

A similar argument to that presented for the case of simple source protection in Section III shows that no loss of generality is incurred by imposing these constraints. Actually, the value of $s_q^k$[n] is immaterial if $k \geq k_{min}(r_q[n])$, since then no retransmission of $E_q$ is required in slot T[n+κ]. As a result, the requirement that $s_q^k[n] \geq s_{q+1}^k[n]$ strictly applies only for those $k < k_{min}(r_q[n])$. Nevertheless, it remains true that the constraints of equation (11) can be imposed as-is, without adversely affecting the expected utility. The expected total transmission length associated with frame F[n] may be expressed as $$E[L[n]] = \sum_{k=0}^{N} \rho_k \sum_q L_q[n] R(k, r_q[n], s_q^k[n]) \quad (12)$$

where $R(k, r_q[n], s_q^k[n])$ is the ratio between the total coded length (in its primary and secondary slots) and the uncoded length of $E_q$[n], if redundancy index $r_q$[n] is assigned in the primary slot T[n], if only k of the N packets transmitted in that slot are received correctly, and if the remaining data is retransmitted with a redundancy index of $s_q^k$[n] in slot T[n+κ].

In order to account for the complex interaction between current and future redundancy indices, we adopt a global perspective. Consider for a moment the global objective of maximizing the total expected utility $E[\Sigma_n U[n]]$, subject to some constraint on the total expected length $E[\Sigma_n L[n]]$. Following the same reasoning presented in Section III, solutions which maximize such a global objective form a family, parametrized by $\lambda$. The redundancy indices associated with each member of this family (i.e., with each $\lambda$) are those which maximize $$E\left[\sum_n U[n]\right] - \lambda E\left[\sum_n L[n]\right] \quad (13)$$

The basic idea behind our formulation is as follows. In each transmission slot T[n], we select redundancy indices which maximize the Lagrange-style objective of equation (13), where the expectations are conditioned on whatever information is already known at the start of T[n], adjusting $\lambda$ until the redundancy indices selected in this way satisfy the encoded length constraint for slot T[n] as tightly as possible, i.e., $$\sum_q L_q[n]R(r_q[n]) + \quad (14)$$

$$\sum_q L_q[n-\kappa] \cdot [R(k_{n-\kappa}, r_q[n-\kappa], s_q[n-\kappa]) - R(r_q[n-\kappa])] \leq L_{max}$$

Note that $R(k_{n-\kappa}, r_q[n-\kappa], s_q[n-\kappa]) - R(r_q[n-\kappa])$ represents the ratio between the encoded length contribution to T[n] and the uncoded length of element $E_q[n-\kappa]$. Before moving to the optimization algorithm, it is worth mentioning that the actual value of $\lambda$ which satisfies the length constraint in equation (14) may vary from slot to slot. This may happen for any number of reasons which cannot be foreseen ahead of time—e.g., variations in the source statistics, variations in the channel error rate, and so forth. As a result, the redundancy indices found in each successive transmission slot may be solutions to different global optimization problems, jeopardizing the global optimality of the solution found in any given transmission slot. One might attempt to account for this by generating statistical models for the evolution of $\lambda$ in future transmission slots. Details of such modeling, however, are beyond the scope of the present invention. Instead, when formulating the expectations found in equations (10) and (12), the preferred embodiment of the invention presumes that the hypothetical redundancy indices $s_q^k[n]$ will be selected in accordance with the same global optimization objective, having the same value of $\lambda$ as that selected for the present transmission slot.

A. Rewriting the Optimization Objective

Eliminating all terms from equation (13) which do not depend upon $r_q[n]$ and $s_q[n-\kappa K]$, and writing $k_{n-\kappa}$ for the actual number of packets from slot T[n-$\kappa$] which were correctly received, we see that the objective in transmission slot T[n] is to maximize $$J_\lambda(\{r_q[n]\}_q, \{s_q^0[n]\}_q, \ldots, \{s_q^N[n]\}_q, \{s_q[n-\kappa]\}_q) = \quad (16)$$

$$\sum_{k=0}^N \rho_k \sum_q U_q[n]P(k, r_q[n], s_q^k[n]) +$$

$$\sum_q U_q[n-\kappa]P(k_{n-\kappa}, r_q[n-\kappa], s_q[n-\kappa]) -$$

$$\lambda \sum_{k=0}^N \rho_k \sum_q L_q[n]R(k, r_q[n], s_q^k[n]) -$$

$$\lambda \sum_q L_q[n-\kappa]R(k_{n-\kappa}, r_q[n-\kappa], s_q[n-\kappa])$$

subject to the constraints $r_q[n] \geq r_{q+1}[n], \forall q, s_q^k[n] \geq s_{q+1}^k[n], \forall k,q$ and $s_q[n-\kappa] \geq s_{q+1}[n-\kappa], \forall q$ finding the smallest value of $\lambda$ for which the actual transmission cost in slot T[n] satisfies equation (14).

For the sake of clarification we note that the values of $r_q[n-\kappa K]$ are known when we come to solve this optimization problem. For this reason, we omit the superscript from the redundancy indices $s_q[n-\kappa]$ which are not hypothetical. It is particularly worth noting that the optimization must be performed jointly over both the actual redundancy indices and the hypothetical redundancy indices, $s_q^k[n]$, even though the latter do not contribute to the length constraint in equation (14).

At this point, it is convenient to simplify the notation in equation (15), using primes to distinguish quantities which belong to frame F[n-$\kappa$] from those belonging to F[n]. Thus, for example, $U'_q \equiv U_q[n-\kappa]$, $s'_q \equiv s_q[n-\kappa]$, $s_q^k \equiv s_q^k[n]$ and $k' \equiv k_{n-\kappa}$. With this notation, the optimization objective becomes $$J_\lambda(\{r_q\}_q, \{s_q^0\}_q, \ldots, \{s_q^N\}_q, \{s'_q\}_q) = \quad (1)$$

$$\underbrace{\sum_{k=0}^N \rho_k \sum_q [U_q P(k, r_q, s_q^k) - \lambda L_q R(k, r_q, s_q^k)]}_{\Psi_\lambda(\{r_q\}_q, \{s_q^0\}_q, \ldots, \{s_q^N\}_q)} +$$

$$\underbrace{\sum_q [U'_q P(k', r'_q, s'_q) - \lambda L'_q R(k', r'_q, s'_q)]}_{}$$

and the parameter constraints become $r_q \geq r_{q+1}, s_q^k \geq s_{q+1}^k,$ and $s'_q \geq s'_{q+1}, \forall k,q$ (1

Note also that the task of maximizing $J_\lambda$ subject to equation (18) is equivalent to the two independent tasks of maximizing $J'_\lambda$ subject to $s'_q \geq s'_{q+1}$ and $\Psi_{80}$ subject to $r_q \geq r_{q+1}$ and $s_q^k \geq s_{q+1}^k$, where $J'_\lambda$ and $\Psi_\lambda$ are identified parenthetically in equation (17).

The remainder of this section is organized as follows. We first describe the mechanics of retransmission, providing expressions for the terms $P(k, r_q, s_q)$ and $R(k, r_q, s_q)$. Next, we consider the solution to the above optimization objective, in the simple case where each source frame has only one element. Finally, we show that the solution to the general problem is essentially no more complex than that developed for the single element case since, under reasonable conditions, $J_\lambda$ may be optimized separately for each q, and the resulting solutions are guaranteed to satisfy the constraints of equation (18).

B. The Mechanics of Retransmission

Following the definition in equation (4), the number of packets which must be received if element $E_q$ is to be recovered from its primary transmission slot is $k_{min}(r_q)$. If $k \geq k_{min}(r_q)$, there is no need for any retransmission. Suppose that $k < k_{min}(r_q)$ primary transmission packets are received. Since the transmitter knows exactly which packets were received, it has only to retransmit the information from $E_q$ which is contained within any $k_{min}(r_q)-k$ of the N-k packets which were lost. Thus, for the purpose of retransmission, the length of element $E_q$ is effectively reduced to $\theta_{k,r_q}L_q$, where $$\theta_{k,r_q} = \frac{k_{min}(r_q) - k}{k_{min}(r_q)} = 1 - \frac{k}{k_{min}(r_q)}, \; 0 \le k < k_{min}(r_q)$$

Note that this expression is also valid for the special case $r_q=0$, for which $k_{min}(0)=\infty$ and $\theta_{k,0}=1$.

Figure 6:
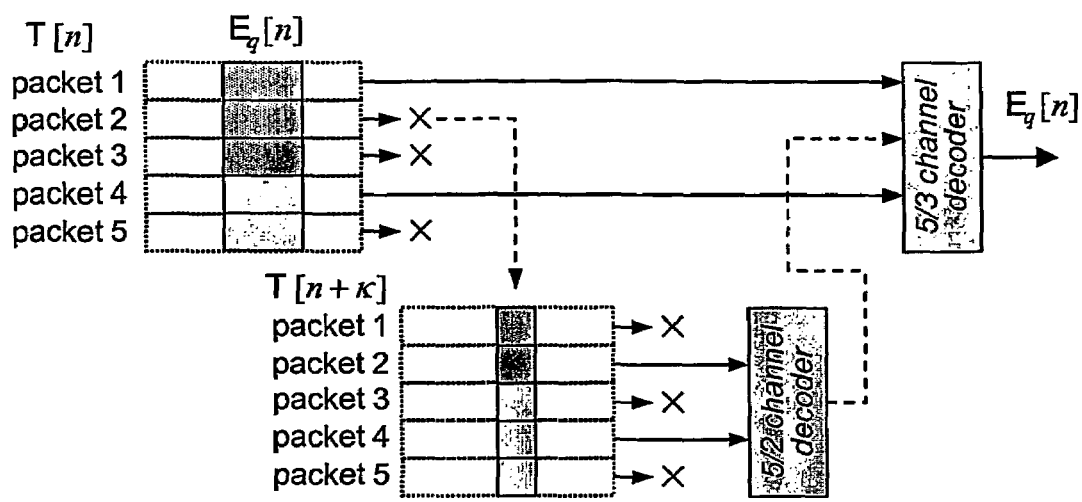
FIG. 6 illustrates the decoding of an element in a source frame from its primary and secondary transmission slots.

During retransmission, the $\theta_{k,r_q} L_q$ source symbols from element $E_q$ are assigned the secondary redundancy index $s_q$, leading to a transmission cost of $\theta_{k,r_q} L_q R(s_q)$, and an expected utility of $U_q P(s_q)$. The receiver is able to recover $E_q$ so long as $k_{min}(s_q)$ of the N packets sent during the element's secondary transmission slot are received. To do so, the receiver must first decode the secondary channel code, recovering the $\theta_{k,r_q} L_q$ missing source symbols which are required to decode the primary channel code. These procedures are illustrated in FIG. 6. The following expressions are readily obtained for $P(k, r_q, s_q)$ and $R(k, r_q, s_q)$.

$$P(k, r_q, s_q) = \begin{cases} P(s_q), & k < k_{min}(r_q) \\ 1, & k \ge k_{min}(r_q) \end{cases} \quad (19)$$

$$R(k, r_q, s_q) = R(r_q) + \begin{cases} \theta_{k,r_q} R(s_q), & k < k_{min}(r_q) \\ 0, & k \ge k_{min}(r_q) \end{cases} \quad (20)$$

C. Single Element Frames

To provide a more accessible introduction to the channel code assignment problem, we first consider the case in which each frame $F[n]$ has only one source element. Let $E_q[n]$ denote this source element; the subscript q is superfluous in this case, but we preserve it for the sake of later extension to source frames with multiple elements. Substituting the expressions from equations (19) and (20) into equation (17), we obtain $$\Psi_{\lambda,q}(r_q, s_q^0, \ldots, s_q^N) = \left(U_q \sum_{k=k_{min}(r_q)}^{N} \rho_k\right) - \lambda R(r_q) L_q + \sum_{k=0}^{k_{min}(r_q)-1} \rho_k \left(U_q P(s_q^k) - \lambda \theta_{k,r_q} R(s_q^k) L_q\right) = U_q P(r_q) - \lambda R(r_q) L_q + \sum_{k=0}^{k_{min}(r_q)-1} \rho_k \left(U_q P(s_q^k) - \lambda \theta_{k,r_q} R(s_q^k) L_q\right) \quad (21)$$

and $$J'_{\lambda,q}(s'_q) = \begin{cases} U'_q P(s'_q) - \lambda R(r'_q) L'_q - \lambda \theta_{k',r'_q} R(s'_q) L'_q, & k' < k_{min}(r'_q) \\ U'_q - \lambda R(r'_q) L'_q, & k' \ge k_{min}(r'_q) \end{cases}$$

Recall that k' and $r'_q$ are known indices. Noting that $s'_q$ is relevant only when $k' < k_{min}(r'_q)$, the task of maximizing $J'_{\lambda,q}(s'_q)$ is equivalent to that of maximizing $$U'_q P(s'_q) - \lambda' R(s'_q) L'_q, \text{ where } \lambda' = \lambda \theta_{k',r'_q}$$

As explained in Section III, the maximizing $s'_q$ must be drawn from $H_C$, the upper convex hull of the channel coding probability-redundancy characteristic. In fact, the maximizing $s'_q$ is found using equation (9) to be $$s'_q = \max\left\{j_i \in H_C \;\middle|\; S_C(i) \frac{U'_q}{L'_q} \ge \lambda \theta_{k',r'_q}\right\}$$

Similarly, for any given value of $r_q=r$, the hypothetical retransmission indices $s_q^{k,r}$ which maximize $\Psi_{\lambda,q}(r, s_q^{0,r}, \ldots s_q^{N,r})$ are simply those which independently maximize the terms $U_q P(s_q^k) - \lambda \theta_{k,r} R(s_q^k) L_q$, the solution to which is $$s_q^{k,r} = \max\left\{j_i \in H_C \;\middle|\; S_C(i) \frac{U_q}{L_q} \ge \lambda \theta_{k,r}\right\} \quad (22)$$

Here, we use the notation $s_q^{k,r}$ to express the dependence of the optimal hypothetical redundancy indices on the primary redundancy index, $r_q=r$. We are then left with the problem of determining $r_q$. Due to the complex interaction between $r_q$ and the $s_q^k$, it is not generally sufficient to consider only those indices which belong to the convex hull, $H_C \subset R$. In the case of Reed-Solomon codes, the set R consists of all r in the range 0 through N and for the purpose of assessing complexity, we shall henceforth assume this maximally sized set of possible redundancy indices.

At first glance, the apparent need for an exhaustive search may appear to render the invention computationally unattractive. For each of the N+1 possible indices $r \in R$, the $k_{min}(r)-1<N$ hypothetical optimization problems represented by equation (22) must each be solved, and each of these involves up to $\|H_C\| \ge N+1$ comparisons. This would suggest a complexity of at most $N(N+1)^2 \approx N^3$ comparisons. We can readily simplify this by exploiting the monotonicity of $S_C(i)$ in a binary search for the solution to equation (22), leaving us with a complexity of $N(N+1)\log_2\|H_C\| \approx N^2 \log_2 N$ comparisons.

Fortunately, the exhaustive search may be even further simplified by observing that the $s_q^{k,r}$ values recovered using equation (22) are monotonically non-decreasing with r. To see this, observe that $k_{min}(r)$ is a strictly decreasing function of r, hence $\theta_{k,r}=1-k/k_{min}(r)$ is also strictly decreasing with r, but $s_q^{k,r}$ is a non-increasing function of $\lambda \theta_{k,r}$. In the preferred embodiment of the invention, this property is exploited by the following strategy for finding the $s_q^{k,r}$ for each k and each $r \in R$.

For each k, $s_q^{k,r}$ is evaluated at $r=0, 1, \ldots, N$ in sequence. Thus, when we come to evaluate $s_q^{k,r}$ we already know the value of $s_q^{k,r-1}$; we also know that $s_q^{k,r} \ge s_q^{k,r-1}$. The inequality in equation (22) is evaluated starting with the first $j_i \in H_C$ which is greater than $s_q^{k,r-1}$, and continuing until some $j_i \in H_C$ yields $S_C(i) U_q / L_q < \lambda \theta_{k,r}$. In this way, the inequality must be evaluated exactly $1+\|(s_q^{k,r-1}, s_q^{k,r}] \cap H_C\|$ times. It follows that the total number of times the inequality must be evaluated, in order to compute $s_q^{k,r}$ for all $r \in R$, is bounded by $$(N+1)+\|(0, s_q^{k,N}] \cap H_C\| \le (2N+1) \quad (23)$$

Actually, the bound on the right hand side of equation ( ) can always be reduced by 1. To see this, note that the complexity expression on the left assumes that we always test the inequality of equation (22) until it fails. However, $\|(0, s_q^{k,N}] \cap H_C\|$ can only equal N if $s_q^{k,N}=N$, in which case we will never perform a test for $s_q^{k,N}$ in which the inequality fails. The complexity bound can thus be reduced to 2N tests. This observation will prove more significant in Section IV-E. To conclude, we note that the number of values for k which must be considered is bounded by N. Thus, the total number of comparisons required to maximize $\Psi_{\lambda,q}$ is at most $2N^2$. A tighter bound, of the same order, could be developed by exploiting the fact that $s_q^{k,r}$ need not be evaluated for $k \geq k_{min}(r)$.

D. Extension to Multiple Source Elements

We now tackle the general problem of maximizing the objective function $J_\lambda$ in equation (17), subject to the constraints in equation (18). As in the single element case, maximization of the second term $J'_\lambda(s'_1, s'_2, \dots)$, subject to $s'_q \geq s'_{q+1}$, is an independent problem whose solution has already been described in Section III. For the first term, $\Psi_\lambda(\{r_q\}, \{s_q^k\})$, coupling between the primary and hypothetical redundancy indices, $r_q$ and $s_q^k$, would appear to present some difficulties. While exhaustive search through all possible $r_q$ values is tractable for a single element, the number of possible combinations for the indices $r_1$ through $r_Q$ grows exponentially with Q. Fortunately, however, this is not necessary. Evidently, $$\Psi_\lambda(\{r_q\}_q, \{s_q^0\}_q, \dots, \{s_q^N\}_q) = \sum_q \Psi_{\lambda,q}(r_q, s_q^0, \dots s_q^N)$$

where the terms $\Psi_{\lambda,q}$ are given by equation (21). Thus, it is sufficient to maximize each $\Psi_{\lambda,q}$ independently, following the method outlined in Section IV-C, so long as we can be guaranteed that the independent solutions will satisfy the constraints in equation (18). We now show that this is the case, subject to some reasonable assumptions.

As in Section III, we assume that the source utility-length characteristic is convex, alternatively, we first find the convex hull and then enforce the constraint that any element not on the convex hull must receive the same protection assignment as the next element which does lie on the convex hull, satisfying equation (5). The following lemma shows that the hypothetical retransmission indices, $s_q^k$, will satisfy the necessary constraints so long as the primary redundancy indices $r_q$ do. This simplifies our task to that of showing that the solutions which maximize each $\Psi_{\lambda,q}$ independently satisfy $r_q \geq r_{q+1}$, $\forall q$.

Lemma 1: Suppose the redundancy indices $\{r_q\}_q$ and $\{s_q^k\}_{q,k}$ which independently maximize each $\Psi_{\lambda,q}$ in equation (21) satisfy $r_q \geq r_{q+1}$, $\forall q$. Suppose also that the source utility-length characteristic is convex, following equation (5). Then $s_q^k \geq s_{q+1}^k$, $\forall q, k$.

Proof We showed at the end of Section IV-C that $\theta_{k,r}$ is a strictly decreasing function of r. Using equation (22) then, we must have $$s_q^k = \max\left\{ j_i \in H_C \;\middle|\; \frac{U_q}{L_q} \geq \frac{\lambda \theta_{k,r_q}}{S_C(i)} \right\}$$

$$\geq \max\left\{ j_i \in H_C \;\middle|\; \frac{U_q}{L_q} \geq \frac{\lambda \theta_{k,r_{q+1}}}{S_C(i)} \right\}$$

$$\geq \max\left\{ j_i \in H_C \;\middle|\; \frac{U_{q+1}}{L_{q+1}} \geq \frac{\lambda \theta_{k,r_{q+1}}}{S_C(i)} \right\} = s_{q+1}^k$$

The second inequality above follows from the fact that the set of $j_i$ for which $$\frac{U_q}{L_q} \geq \frac{\lambda \theta_{k,r_{q+1}}}{S_C(i)}$$

necessarily contains the set of $j_i$ for which $$\frac{U_{q+1}}{L_{q+1}} \geq \frac{\lambda \theta_{k,r_{q+1}}}{S_C(i)},$$

since $$\frac{U_{q+1}}{L_{q+1}} \leq \frac{U_q}{L_q}.$$

To show that $r_q \geq r_{q+1}$, we begin by writing $\Psi_{\lambda,q}(r) = \Psi_{\lambda,q}(r, s_q^{0,r}, \dots s_q^{N,r})$ where the $s_q^{k,r}$ are given by equations ~( ). That $\Psi_{\lambda,q}(r)$ is the maximum value which the objective function can attain, given that $r_q$ is set to r. The following lemma embodies the key result which we must show.

Lemma 2: Let $r_A$ and $r_B$ be any two redundancy indices satisfying $r_A > r_B$ and suppose that $\Psi_{\lambda,q}(r_A) > \Psi_{\lambda,q}(r_B)$ for some $q > 1$. Then we must also have $\Psi_{\lambda,q-1}(r_A) > \Psi_{\lambda,q-1}(r_B)$, so long as the source utility-length characteristic is convex, satisfying equation (5), and the set of channel code redundancies which belong to $H_C$ is sufficiently dense.

We defer the proof of this key result to the appendix. The last condition, however, deserves some comment here. Our proof relies upon passing to a continuous model for the convex hull of the channel coding probability-redundancy characteristic. This indicates that the result might hold only when a very dense collection of channel codes is available. In practice, extensive numerical studies suggest that the result always holds, even in the discrete case, but we do not have a formal proof that this must be true. Our idealized proof in the appendix at least shows that enforcing the constraint $r_q \geq r_{q+1}$ while passing from the optimization of $\Psi_{\lambda,q}$ to that of $\Psi_{\lambda,q+1}$ is unlikely to produce sub-optimal results, and that any such likelihood diminishes as the available set of channel code redundancies increases.

Corollary 3: If $r = r_A$ maximizes $\Psi_{\lambda,q}(r)$ then it is always possible to find $r = r_B$ which maximizes $\Psi_{\lambda,q+1}(r)$ such that $r_B \leq r_A$. Proof: Suppose, to the contrary, that any $r = r_B$ which maximizes $\Psi_{\lambda,q+1}(r)$ has $r_B > r_A$. This means, in particular, that $\Psi_{\lambda,q+1}(r_B) > \Psi_{\lambda,q+1}(r_A)$. According to Lemma 2 then, we must also have $\Psi_{\lambda,q}(r_B) > \Psi_{\lambda,q}(r_A)$ so that $r_A$ cannot be the value of r which maximizes $\Psi_{\lambda,q}(r)$.

E: Complexity with Multiple Source Elements

We saw in Section IV-C that the inequality in equation (22) must be evaluated at most $2N^2$ times in order to maximize $\Psi_{\lambda,q}$. Since each source frame has Q elements, it is clear that all Q optimization problems can be solved using at most $2N^2Q$ comparisons. For large Q, however, the preferred embodiment of the invention exploits the monotonicity relationships of Lemma 1 and Corollary 3 to substantially reduce this complexity. This is achieved using the following branch and bound strategy.

We start by solving the single element optimization problem associated with element $E_{q_1}$, where $q_1 \approx Q/2$, at a cost of $2N^2$ comparisons (we are ignoring the much lower cost of maximizing the $J'_{\lambda,q}$ terms here). The solution to this problem divides the set of redundancy indices which may be selected for $r_q$ and $s_q^k$ into two halves, depending on whether $q < q_1$ or $q > q_1$. We next solve the two single element optimization problems associated with $q_2 \approx Q/4$ and $q_3 \approx 3Q/4$. In solving these problems, we need only consider $r_{q_2} \in [r_{q_1}, N]$, $r_{q_3} \in [0, r_{q_1}]$, $s_{q_2}^k \in [s_{q_1}^k, N]$ and $s_{q_3}^k \in [0, s_{q_1}^k]$. A trivial modification of the argument provided at the end of Section IV-C shows that $s_{q_2}^{k,r}$ may be evaluated for all $r \in \lfloor r_{q_1}, N \rfloor$ using at most $(N-r_{q_1}+1)+\|(s_{q_1}^k, s_{q_2}^{k,N}] \cap H_C\|$ comparisons, while $s_{q_3}^{k,r}$ may be evaluated for all $r \in \lfloor 0, r_{q_1} \rfloor$ using at most $(r_{q_1}+1)+\|(0, s_{q_1}^k] \cap H_C\|$ comparisons. The total number of comparisons required to evaluate both $s_{q_2}^{k,r}$ and $s_{q_3}^{k,r}$ for all relevant $r$ is thus bounded by $(N+2)+(\|H_C\|-1) \leq 2N+2$.

Following the same argument as in Section IV-C, we note that the bound of $2N+2$ can always be reduced by 2. This is because the above complexity expressions are based on the assumption that we always test the inequality in equation (22) until it fails, but there is no need to test $s_{q_{22}}^{k,r}$ and $s_{q_3}^{k,r}$ values which exceed the known bounds of $N$ and $s_{q_1}^k$, respectively. As before, we note that the number of values for $k$ which must be considered is bounded by $N$ (although tighter bounds can be found), so that the total number of comparisons required to maximize both $\Psi_{\lambda,q_2}$ and $\Psi_{\lambda,q_3}$ is at most $2N^2$.

We proceed by solving the four single element optimization problems associated with $q_4 \approx Q/8$, $q_5 \approx 3Q/8$, $q_6 \approx 5Q/8$ and $q_7 \approx 7Q/8$. The reader may verify that the total number of comparisons required to evaluate $s_{q_4}^{k,r}$, $s_{q_5}^{k,r}$, $s_{q_6}^{k,r}$, and $s_{q_7}^{k,r}$, for all relevant $r$, is again given by $2N^2$. Continuing in this way, after a total of $V$ subdivision steps, we solve a total of $2^V - 1$ single element optimization problems using at most $2N^2V$ comparisons. Associating $2^V - 1$ with $Q$, we see that the total complexity is of order $2N^2 \log_2(Q+1)$, which is substantially less than $2N^2Q$, for large $Q$.

The above analysis is concerned only with maximization of the $\Psi_{\lambda,q}$ terms. As already noted, maximization of $J'_{\lambda,q}$ is significantly simpler, having complexity no larger than that of regular frame-by-frame PET. For fixed length transmission slots, the optimization of $\Psi_{\lambda,q}$ and $J'_{\lambda,q}$ must be conducted within an outer loop, which adjusts $\lambda$ until equation (14) is satisfied sufficiently tightly. While more sophisticated $\lambda$ search strategies exist, a simple bisection search requires only one iteration for each bit in the numerical representation with which we choose for $\lambda$. For most practical applications, a logarithmic fixed point representation of $\lambda$ suffices, with between 8 and 16 bits of precision. Depending on the application, an alternate rate control strategy may be adopted, in which $\lambda$ is adapted slowly from transmission slot to transmission slot, subject to a conventional leaky bucket model which constrains the average transmission rate. In this case, $\Psi_{\lambda,q}$ and $J'_{\lambda,q}$ must be optimized for only one value of $\lambda$ within any given transmission slot.

APPENDIX

Proof of Lemma 2: We are given $r_A > r_B$ and $\Psi_{\lambda,q}(r_A) > \Psi_{\lambda,q}(r_B)$, from which we wish to show that $\Psi_{\lambda,q-1}(r_A) > \Psi_{\lambda,q+1}(r_B)$. Writing $S_q = U_q/L_q$ and noting that $S_{q-1} \geq S_q$, it is sufficient to show that $$\Psi_{A-B}(S_q) = \frac{\Psi_{\lambda,q}(r_A) - \Psi_{\lambda,q}(r_B)}{L_q}$$

is an increasing function of $S_q$. Using equation (21), we expand $\Psi_{A-B}(S_q)$ as $$\Psi_{A-B}(S_q) =$$

$$\left( S_q \sum_{k=k_{min}(r_A)}^{N} \rho_k \right) - \lambda R(r_A) + \sum_{k=0}^{k_{min}(r_A)-1} \rho_k \left( S_q P(s_q^{k,r_A}) - \lambda \theta_{k,r_A} R(s_q^{k,r_A}) \right) -$$

$$\left( S_q \sum_{k=k_{min}(r_B)}^{N} \rho_k \right) - \lambda R(r_B) + \sum_{k=0}^{k_{min}(r_B)-1} \rho_k \left( S_q P(s_q^{k,r_B}) - \lambda \theta_{k,r_B} R(s_q^{k,r_B}) \right)$$

Now recall that $P(r) = \sum_{k=k_{min}(r)}^{N} \rho_k$, so we can write $R(r)$ as $\sum_{k=k_{min}(r)}^{N} \rho_k R(r)/P(r)$. This, together with the fact that $k_{min}(r_A) < k_{min}(r_B)$ allows us to express $\Psi_{A-B}(S_q)$ as a sum of terms, weighted by $\rho_k$. Specifically, $$\Psi_{A-B}(S_q) =$$

$$\sum_{k=0}^{k_{min}(r_A)-1} \rho_k \left( S_q [P(s_q^{k,r_A}) - P(s_q^{k,r_B})] - \lambda [\theta_{k,r_A} R(s_q^{k,r_A}) - \theta_{k,r_B} R(s_q^{k,r_B})] \right) +$$

$$\sum_{k=k_{min}(r_A)}^{k_{min}(r_B)-1} \rho_k \left( S_q [1 - P(s_q^{k,r_B})] - \lambda \left[ \frac{R(r_A)}{P(r_A)} - \theta_{k,r_B} R(s_q^{k,r_B}) \right] \right) +$$

$$\sum_{k=k_{min}(r_B)}^{N} \rho_k \left( -\lambda \left[ \frac{R(r_A)}{P(r_A)} - \frac{R(r_B)}{P(r_B)} \right] \right)$$

Note that the terms $s_q^{k,r}$ depend only on $k$, $r$, $\lambda$ and $S_q$. Specifically, from equation (22), we have $$s_q^{k,r} = \max\{j_i \in H_C | S_q S_C(i) \geq \lambda \theta_{k,r}\} \quad (24)$$

To complete the proof, we show that each term in the above summations is an increasing function of $S_q$. The terms in the third summation do not depend on $S_q$, either directly or through $s_q^{k,r_A}$ and $s_q^{k,r_B}$, so we need only concern ourselves with the first two summations. Specifically, we show that $$W_{k,r_A,r_B}(S_q) = S_q [P(s_q^{k,r_A}) - P(s_q^{k,r_B})] - \lambda [\theta_{k,r_A} R(s_q^{k,r_A}) - \theta_{k,r_B} R(s_q^{k,r_B})]$$

and $$Z_{k,r_B}(S_q) = S_q [1 - P(s_q^{k,r_B})] + \lambda \theta_{k,r_B} R(s_q^{k,r_B})$$

are both increasing functions of $S_q$.

As noted in connection with the statement of Lemma 2, we find it necessary to pass to a continuous model of the channel coding probability-redundancy characteristic on its convex hull. This allows us to express equation (24) as $$S_q G_{k,r}(S_q) = \lambda \theta_{k,r}, \text{ where } G_{k,r}(S_q) = \frac{\partial P}{\partial R}(s_q^{k,r})$$

Here, we are using the fact that $S_C(i)$ is the slope of the channel coding probability-redundancy characteristic on its convex hull, as expressed by equation (8). In the limit, as the density of available channel codes grows without bound, we may replace $S_C(i)_{j_i = 3_q^{k,r}}$ with the derivative, $$\frac{\partial P}{\partial R}(s_q^{k,r}).$$

The notation $G_{k,r}(S_q)$ makes explicit the fact that $s_q^{k,r}$, and hence this derivative, depends only on k, r and $S_q$. In the same way, it is convenient to write $P_{k,r}(S_q)$ for $P(s_q^{k,r})$ and $R_{k,r}(S_q)$ for $R_{k,r}(S_q^{k,r})$, from which we obtain $$W_{k,r_A,r_B}(S) = S[P_{k,r_A}(S) - P_{k,r_B}(S)] - \\ S[G_{k,r_A}(S)R_{k,r_A}(S) - G_{k,r_B}(S)R_{k,r_B}(S)]$$

$$= S \cdot \begin{bmatrix} (P_{k,r_A}(S) - G_{k,r_A}(S)R_{k,r_A}(S)) - \\ (P_{k,r_B}(S) - G_{k,r_B}(S)R_{k,r_B}(S)) \end{bmatrix}$$

and $$Z_{k,r_B}(S) = S \cdot [1 - P_{k,r_B}(S) + G_{k,r_B}(S)R_{k,r_B}(S)]$$

Taking the derivative of $W_{k,r_A,r_B}(S)$ with respect to S, and using the fact that $$\frac{\partial P_{k,r}}{\partial S} = \frac{\partial P_{k,r}}{\partial R_{k,r}} \frac{\partial R_{k,r}}{\partial S} = G_{k,r} \frac{\partial R_{k,r}}{\partial S}$$

we get $$\frac{\partial W_{k,r_A,r_B}}{\partial S} = (P_{k,r_A} - G_{k,r_A}R_{k,r_A}) - (P_{k,r_B} - G_{k,r_B}R_{k,r_B}) + \\ S\left(\frac{\partial P_{k,r_A}}{\partial S} - R_{k,r_A}\frac{\partial G_{k,r_A}}{\partial S} - G_{k,r_A}\frac{\partial R_{k,r_A}}{\partial S}\right) - \\ S\left(\frac{\partial P_{k,r_B}}{\partial S} - R_{k,r_B}\frac{\partial G_{k,r_B}}{\partial S} - G_{k,r_B}\frac{\partial R_{k,r_B}}{\partial S}\right)$$

$$= (P_{k,r_A} - G_{k,r_A}R_{k,r_A}) - (P_{k,r_B} - G_{k,r_B}R_{k,r_B}) - \\ SR_{k,r_A}\frac{\partial G_{k,r_A}}{\partial S} + SR_{k,r_B}\frac{\partial G_{k,r_B}}{\partial S}$$

Differentiating equation (25) yields $G_{k,r} = -S\partial G_{k,r}/\partial S$, which we substitute into the above to obtain $$\frac{\partial W_{k,r_A,r_B}}{\partial S} = (P_{k,r_A} - G_{k,r_A}R_{k,r_A}) - (P_{k,r_B} - G_{k,r_B}R_{k,r_B}) + \\ R_{k,r_A}G_{k,r_A} - R_{k,r_B}G_{k,r_B}$$

$$= P_{k,r_A} - P_{k,r_B} = P(s_q^{k,r_A}) - P(s_q^{k,r_B}) \geq 0$$

Here we have used the fact that $s_q^{k,r}$ is a non-decreasing function of r, as shown in Section and that P(s) is an increasing function of s. Similarly, taking the derivative of $Z_{k,r_B}(S)$ with respect to S, we also find that $$\frac{\partial Z_{k,r_B}}{\partial S} = [1 - P_{k,r_B} + G_{k,r_B}R_{k,r_B}] + \\ S\left[-\frac{\partial P_{k,r_B}}{\partial S} + G_{k,r_B}\frac{\partial R_{k,r_B}}{\partial S} + R_{k,r_B}\frac{\partial G_{k,r_B}}{\partial S}\right]$$

$$= 1 - P_{k,r_B} + G_{k,r_B}R_{k,r_B} + SR_{k,r_B}\frac{\partial G_{k,r_B}}{\partial S}$$

$$= 1 - P_{k,r_B} + G_{k,r_B}R_{k,r_B} - G_{k,r_B}R_{k,r_B} = 1 - P_{k,r_B} > 0$$

REFERENCES

[1] R. Puri and K. Ramchandran, "Multiple description source coding using forward error correction codes," Signals, Systems and Computers, 1999. Conference Record of the Thirdy-Third Asilomar Conference, vol. 1, pp. 342-346, October 1999.

[2] A. Mohr, E. Riskin, and R. Ladner, "Unequal loss protection: graceful degradation of image quality over packet erasure channels through forward error correction," IEEE Journal on Selected Areas in Comm., vol. 18, pp. 819-828, June 2000.

[3] A. Mohr, R. Ladner, and E. Riskin, "Approximately optimal assignment for unequal loss protection," Proc. IEEE Int. Conf. Image Proc., vol. 1, pp. 367-370, September 2000.

[4] T. Stockhammer and C. Buchner, "Progressive texture video streaming for lossy packet networks," Proc. 11'th International Packet Video Workshop, May 2001.

[5] S. Dumitrescu, X. Wu, and Z. Wang, "Globally optimal uneven error-protected packetization of scalable code streams," Proc. IEEE Data Compression Conf. (Snowbird), pp. 73-82, April 2002.

[6] V. Stankovic, R. Hamzaoui, and Z. Xiong, "Packet loss protection of embedded data with fast local search," Proc. IEEE Int. Conf. Image Proc., vol. 2, pp. 165-168, September 2002.

[7] J. Thie and D. Taubman, "Optimal protection assignment for scalable compressed images," Proc. IEEE Int. Conf. Image Proc., vol. 3, pp. 713-716, September 2002.

[8] J. Thie and D. Taubman, "Optimal erasure protection assignment for scalable compressed data with small channel packets and short channel codewords," to appear in EURASIP JASP: Multimedia over IP and Wireless Networks, first quarter 2004.

[9] A. Albanese, J. Blomer, J. Edmonds, M. Luby, and M. Sudan, "Priority encoding transmission," IEEE Trans. Inf. Theory, vol. 42, pp. 1737-1744, November 1996.

[10] M. Podolsky, M. Vetterli, and S. McCanne, "Limited retransmission of real-time layered multimedia," IEEE 2'nd Workshop on Multimedia Signal Processing, pp. 591-596, December 1998.

[11] M. Podolsky, S. McCanne, and M. Vetterli, "Soft arq for layered streaming media," Journal of VLSI Signal Processing for Signal, Image and Video Technology, vol. 27, pp. 81-97, February 2001.

[12] V. Chande, N. Farvardin, and H. Jafarkhani, "Image communication over noisy channels with feedback," Proc. IEEE Int. Conf. Image Proc., vol. 2, pp. 540-544, October 1999.

[13] C.-Y. Hsu and A. Ortega, "Rate control for robust video transmission over burst-error wireless channels," IEEE Journal on Selected Areas in Comm., vol. 17, pp. 756-773, May 1999.

[14] P. Chou and Z. Miao, "Rate-distortion optimized streaming of packetized media," Microsoft Tech. Report MSR-TR-2001-35 (submitted to IEEE Trans. Multimedia), February 2001.

[15] G. Cheung, W.-t. Tan, and T. Yoshimura, "Rate-distortion optimized application-level retransmission using streaming agent for video streaming over 3 g wireless network," Proc. IEEE Int. Conf. Image Proc., vol. 1, pp. 529-532, September 2002.

[16] R. Puri, K. Ramchandran, and A. Ortega, "Joint source channel coding with hybrid FEC/ARQ for buffer constrained video transmission," IEEE Second Workshop on Multimedia Signal Processing, pp. 567-572, December 1998.

[17] P. Chou, A. Mohr, A. Wang, and S. Mehrotra, "Fec and pseudo-arq for receiver-driven layered multicast of audio and video," Proc. IEEE Data Compression Conf. (Snowbird), pp. 440-449, March 2000.

[18] J. Chakareski, P. Chou, and B. Aazhang, "Computing rate-distortion optimized policies for streaming media to wireless clients," Proc. IEEE Data Compression Conf. (Snowbird), pp. 53-62, April 2002.

[19] G. Wang, Q. Zhang, W. Zhu, and Y.-Q. Zhang, "Channel-adaptive error control for scalable video over wireless channel," 7'th Int. Workshop on Mobile Multimedia Communications (MoMuC), October 2000.

[20] T. Stockhammer, H. Jenkac, and C. Weiss, "Feedback and error protection strategies for wireless progressive video transmission," IEEE Trans. Circ. Syst. for Video Tech., vol. 12, pp. 465-482, June 2002.

[21] X. Zheng, S.-H. Chan, Q. Zhang, W.-W. Zhu, and Y.-Q. Zhang, "Feedback-free packet loss recovery for video multicast," IEEE Int. Conf. Communications, vol. 2, pp. 870-874, April 2003.

[22] T. Gan and K.-K. Ma, "Sliding-window packetization for forward error correction based multiple description transcoding," Proc. IEEE Int. Conf. Acoust. Speech and Sig. Proc., vol. 5, pp. 756-759, April 2003.

[23] T. Gan and K.-K. Ma, "Sliding-window packetization for unequal loss protection based multiple description coding," Proc. IEEE Int. Conf. Image Proc., vol. 3, pp. 641-644, September 2003.

[24] J. Shapiro, "An embedded hierarchical image coder using zerotrees of wavelet coefficients," Proc. IEEE Data Compression Conf. (Snowbird), pp. 214-223, 1993.

[25] A. Said and W. Pearlman, "A new, fast and efficient image codec based on set partitioning in hierarchical trees," IEEE Trans. Circ. Syst. for Video Tech., pp. 243-250, June 1996.

[26] D. Taubman and M. Marcellin, JPEG2000: Image Compression Fundamentals, Standards and Practice. Boston: Kluwer Academic Publishers, 2002.

[27] D. Taubman and A. Zakhor, "Multi-rate 3-D subband coding of video," IEEE Trans. Image Proc., vol. 3, pp. 572-588, September 1994.

[28] J. Li and S. Lei, "Rate-distortion optimized embedding," Proc. Picture Coding Symposium, Berlin, pp. 201-206, September 1997.

[29] E. Ordentlich, M. Weinberger, and G. Seroussi, "A low-complexity modeling approach for embedded coding of wavelet coefficients," Proc. IEEE Data Compression Conf. (Snowbird), pp. 408-417, March 1998.

[30] D. Taubman, "High performance scalable image compression with EBCOT," IEEE Trans. Image Proc., vol. 9, pp. 1158-1170, July 2000.

[31] J. Ohm, "Three dimensional subband coding with motion compensation," IEEE Trans. Image Proc., vol. 3, pp. 559-571, September 1994.

[32] D. Taubman and A. Zakhor, "Highly scalable low-delay video compression," Proc. IEEE Int. Conf. Image Proc., vol. 1, pp. 740-744, November 1994.

[33] S. Choi and J. Woods, "Motion compensated 3-D subband coding of video," IEEE Trans. Image Proc., vol. 8, pp. 155-167, February 1999.

[34] A. Secker and D. Taubman, "Motion-compensated highly scalable video compression using an adaptive 3D wavelet transform based on lifting," Proc. IEEE Int. Conf. Image Proc., pp. 1029-1032, October 2001.

[35] B. Pesquet-Popescu and V. Bottreau, "Three-dimensional lifting schemes for motion compensated video compression," Proc. Int. Conf. Acoust. Speech and Sig. Proc., pp. 1793-1796, 2001.

[36] A. Secker and D. Taubman, "Lifting-based invertible motion adaptive transform (LIMAT) framework for highly scalable video compression," to appear in IEEE Trans. Image Proc., December 2003.

[37] G. Van der Auwera, P. Munteanu, P. Schelkens, and J. Cornelis, "Bottom-up motion compensated prediction in wavelet domain for spatially scalable video coding," Electronic Letters, vol. 38, pp. 1251-1253, October 2002.

[38] D. Taubman, "Successive refinement of video: fundamental issues, past efforts and new directions," Int. Symp. Visual Comm. and Image Proc., vol. 5150, pp. 791-805, July 2003.

[39] E. Elliott, "Estimates of error rates for codes on burst-noise channels," Bell Sys. Tech. Journal, vol. 42, pp. 1977-1997, September 1963.

The invention claimed is:

1. A method for transmitting steaming scalably compressed media data over lossy packet-based communication networks, comprising the steps of:
   a) obtaining source data comprising independently encoded groups of elements;
   b) subjecting each element in a current group to primary channel coding with one from a family of channel codes, the channel code family being augmented to include a symbol corresponding to no transmission of the element;
   c) subjecting each element from a previously transmitted group to a secondary channel coding with one from a family of channel codes, the channel code family being augmented to include a symbol corresponding to no transmission of the element; and
   d) transmitting the source data over a sequence of transmission slots, each transmission slot comprising a time interval wherein, in each transmission slot, primary channel coded symbols from elements in the current group are transmitted together with secondary channel coded symbols from elements in the previously transmitted group;
   e) wherein the primary and secondary channel coded symbols transmitted within each transmission slot are arranged into network packets such that each transmission slot has its own set of network packets;
   f) wherein the primary and secondary channel coded symbols sent in each transmission slot are arranged within that slot's network packets following the Priority Encoding Transmission (PET) procedure;
   g) wherein information concerning lost packets which are not received by a receiver is ether received or inferred by the transmitter;
   h) wherein the information concerning lost packets which contain primary coded symbols from said previously transmitted group is used by the transmitter to select secondary channel codes for the elements of the previously transmitted group; and
   i) wherein the secondary channel coding of each element of the previously transmitted group is performed in a manner which takes advantage of the availability at the receiver of primary coded symbols from the previously transmitted group in packets which were successfully transmitted, so as to avoid or reduce redundant retransmission.

2. The method according to claim 1, wherein one or both of said families of channel codes, include a symbol with rate 1.

3. The method of claim 1, in which the families of channel codes used for primary and secondary channel coding have the properties of maximum distance separable (MDS) codes.

4. The method of claim 1, in which the transmitter determines primary and secondary channel codes to use during a particular transmission slot, using estimates of the anticipated packet loss rate.

5. The method of claim 1, in which primary and secondary channel codes are selected within each transmission slot in a manner which is consistent with maximizing a measure of total expected quality of the reconstructed media stream, taken over all groups of elements, where the expectation is conditioned upon knowledge of the channel codes selected in previous transmission slots and the packets lost from previous transmission slots, subject to a constraint on the total transmitted data rate.

6. The method of claim 5, in which the maximization procedure is constrained by a limit on the number of symbols which can be transmitted within the current transmission slot.

7. The method of claim 5, in which the transmitter formulates and optimizes an optimization objective which involves hypotheses regarding the secondary channel codes which will be assigned to elements from the current frame in a future transmission slot, in the event that one packet from the current slot is lost, two packets from the current slot are lost, three packets from the current slot are lost, and so forth.

8. The method of claim 7, in which the optimization objective involves a lambda-balance equation, in which lambda is assumed to take the same value in both the current transmission slot and the future transmission slot in which the hypothetical secondary channel codes shall be selected.

9. The method of claim 1, in which the scalably compressed media data represents a compressed video signal.

10. The method of any of claim 1, in which the scalably compressed media data represents a compressed audio signal.

11. A method for receiving streamed scalably compressed media data over a lossy packet-based communication network, wherein the data is received and sorted into independently encoded groups of elements, comprising the steps of:
 a) receiving data over a sequence of reception slots, each reception slot comprising a time interval wherein primary channel coded symbols from elements in a current group are received together with secondary channel coded symbols from elements in a previous group;
 b) wherein the primary and secondary channel coded symbols within each reception slot are arranged into network packets such that each reception slot has its own set of network packets;
 c) wherein the primary and secondary channel coded symbols received, in each reception slot are arranged within that slot's network packets following the Priority Encoding Transmission (PET) procedure;
 d) wherein a method further comprises the step of unpacking the PET packets and sorting the received data into primary channel coded symbols from elements in the current group and secondary channel coded symbols from elements in the previous group;
 e) assembling the secondary channel coded symbols from elements in the previous group with primary channel coded symbols from elements in the previous group which have already been received in a previous reception slot;
 f) decoding said assembled information for the previous group; and
 g) determining and sending information to the transmitter, concerning lost packets and/or packets which have been received,
 h) wherein the information concerning lost and/or available packets which contain primary coded symbols from said current group is capable of being used by the transmitter to select secondary channel codes for the elements of the current group in a manner which takes advantage of the availability at the receiver of primary coded symbols from the current group in packets which were successfully received, so as to avoid or reduce redundant transmission.

12. A method according to claim 11, wherein the steps of assembling and decoding said secondary and primary channel coded information for elements in the previous group comprise the steps of:
 a) decoding said secondary channel coded symbols;
 b) augmenting the primary channel coded information for those same elements; and
 c) decoding said augmented channel coded information to recover elements from the previous group.

13. A computer readable medium including instructions for controlling a computing system for implementing the method of claim 1.

14. A transmitter for transmitting streaming scalably compressed media data over lossy packet-based communication networks, comprising:
 a) means for obtaining source data comprising independently encoded groups of elements;
 b) means for subjecting each element in a current group to primary channel coding with one from a family of channel codes, the channel code family being augmented to include a symbol corresponding to no transmission of the element;
 c) means for subjecting each element from a previously transmitted group to secondary channel coding with one from a family of channel codes, the channel code family being augmented to include a symbol corresponding to no transmission of the element; and
 d) means for transmitting the source, data over a sequence of transmission slots, each transmission slot comprising a time interval wherein, in each transmission slot, primary channel coded symbols from elements in the current group are transmitted together with secondary channel coded symbols from elements in the previously transmitted group;
 e) wherein the primary and secondary channel coded symbols transmitted within each transmission slot are arranged into network packets such that each transmission slot has its own set of network packets;
 f) wherein the primary and secondary channel coded symbols sent in each transmission slot are arranged within that slot's network packets following the Priority Encoding Transmission (PET) procedure;
 g) wherein information concerning lost packets which are not received by a receiver is ether received or inferred by the transmitter;
 h) wherein the information concerning lost packets which contain primary coded symbols from said previously transmitted group is used by the transmitter to select secondary channel codes for the elements of the previously transmitted group; and
 i) wherein the secondary channel coding of each element of the previously transmitted group is performed in a manner which takes advantage of the availability at the receiver of primary coded symbols from the previously transmitted group in packets which were successfully transmitted, so as to avoid or reduce redundant transmission.

15. A receiver for receiving streamed scalably compressed media data over a lossy packet-based communication network, wherein the data is received and sorted into independently encoded groups of elements, comprising:

a) means for receiving data over a sequence of reception slots, each reception slot comprising a time interval wherein primary channel coded symbols from elements in a current group are received together with secondary channel coded symbols from elements in a previous group;

b) wherein the primary and secondary channel coded symbols within each reception slot are arranged into network packets such that each reception slot has its own set of network packets;

c) wherein the primary and secondary channel coded symbols received in each reception slot are arranged within that slot's network packets following the Priority Encoding Transmission (PET) procedure;

d) wherein the receiver further comprises means for unpacking the PET packets and sorting the received data into primary channel coded symbols from elements in the current group and secondary channel coded symbols from elements in the previous group;

e) means for assembling the secondary channel coded symbols from elements in the previous group with primary channel coded symbols from elements in the previous group which have already been received in a previous reception slot;

f) means for decoding said assembled information for the previous group; and g) means for determining and sending information to the transmitter, concerning lost packets and/or packets which have been received, h) wherein the information concerning at least one lost and available packets which contain primary coded symbols from said current group is capable of being used by the transmitter to select secondary channel codes for the elements of the current group in a manner which takes advantage of the availability at the receiver of primary coded symbols from the current group in packets which were successfully received, so as to avoid or reduce redundant retransmission.

* * * * *